United States Patent [19]

Blytas et al.

[11] 4,401,642

[45] Aug. 30, 1983

[54] FROTH PROCESS

[75] Inventors: George C. Blytas; Zaida Diaz, both of Houston, Tex.

[73] Assignee: Shell Oil Company, Houston, Tex.

[21] Appl. No.: 362,338

[22] Filed: Mar. 26, 1982

Related U.S. Application Data

[63] Continuation-in-part of Ser. No. 267,182, May 26, 1981, abandoned.

[51] Int. Cl.³ .................... C01B 17/04; B01D 53/34
[52] U.S. Cl. ........................... 423/573 G; 423/224; 423/226
[58] Field of Search ............... 423/224, 226, 573, 575, 423/222, 578 R

[56] References Cited

U.S. PATENT DOCUMENTS

| | | | |
|---|---|---|---|
| 3,068,065 | 12/1962 | Hartley et al. | 423/228 |
| 3,099,536 | 7/1963 | Urban et al. | 423/575 |
| 3,580,950 | 5/1971 | Bersworth | 562/565 |
| 3,933,993 | 1/1976 | Salemme | 423/226 |
| 4,009,251 | 2/1977 | Meuly | 423/573 |
| 4,091,073 | 5/1978 | Winkler | 423/226 |
| 4,243,648 | 1/1981 | Fenton | 423/573 |

Primary Examiner—Earl C. Thomas
Attorney, Agent, or Firm—Albert J. Adamcik

[57] ABSTRACT

A cyclic process for the removal of $H_2S$ from gas streams is disclosed, the process being characterized by reaction of the $H_2S$ to sulfur employing specific aqueous solution reactants, and by recovery of the sulfur employing frothing and extraction techniques.

15 Claims, 2 Drawing Figures

FROTH PROCESS

BACKGROUND OF THE INVENTION

This application is a continuation-in-part of our copending application Ser. No. 267,182, entitled Froth Process, filed May 26, 1981, and now abandoned.

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

In yet another process, e.g., that disclosed in U.S. Pat. No. 4,091,073, issued May 23, 1978, to Winkler, $CO_2$ present in the gaseous stream is also removed by the use of a suitable selective absorbent.

A problem associated with such processes is that the solid sulfur produced is of poor quality, i.e., it is very finely divided and difficult to separate from the aqueous reactant solution. A process which provided for the efficient reaction of $H_2S$ and removal of the sulfur produced could have great economic importance.

SUMMARY OF THE INVENTION

Accordingly, the invention relates to a process for the removal of $H_2S$ from a sour gaseous stream comprising contacting the sour gaseous stream in a contacting zone with an aqueous reactant mixture, the aqueous reactant mixture comprising an effective amount of a reactant selected from the group consisting of polyvalent metal ions, polyvalent metal chelate compounds, and mixtures thereof.

A sweet gas stream is produced, and an aqueous admixture containing sulfur and a reduced reactant is removed from the contact zone. The invention provides, at this point, an efficient sulfur removal method which provides good quality sulfur. In particular, the aqueous admixture is contacted in a regeneration zone with an oxygen-containing gas under conditions to produce a regenerated aqueous admixture containing a regenerated reactant and a froth containing sulfur and regenerated aqueous admixture. The oxygen-containing gas oxidizes the reduced metal ions or the metal of the chelate or chelates to a higher valence state. As more fully set out herein, the froth is removed from the regeneration zone and contacted with a liquid extracting composition, and the bulk of the sulfur is removed from the froth. The contacting produces a three phase mass containing, in the upper phase, the liquid extractant composition and solid sulfur, and a second lower phase containing regenerated admixture. Because the extracting composition contacts only the minor portion of aqueous admixture and sulfur in the froth, the separation is efficient, and equipment of reduced size may be employed. Should minor quantities of sulfur remain in the lower phase, the lower phase (or a portion thereof) may be contacted with additional extractant composition to provide further sulfur removal. In either case, the regenerated reactant admixture from the lower phase may, if desired, be returned to the contacting zone. Concomitantly, the bulk of the regenerated aqueous admixture from the regeneration zone is returned to the contacting zone. If necessary or desirable, additional means, such as filters, may be provided during the return of the regenerated aqueous admixture for removal of any sulfur remaining in the admixture.

After contacting the froth, the sulfur-containing liquid extractant composition is removed from the contact zone and treated for removal of the sulfur, and is preferably returned for additional extraction. If, as indicated, supra, the regenerated reactant solution derived from the froth is subjected to an additional extraction, the extractant composition employed, being lightly loaded, may be sent, if desired, for contact with the froth, rather than being subjected to immediate sulfur recovery.

A key feature of the invention is the formation of the froth containing the sulfur and minor amount of regenerated reactant admixture in the regeneration zone. Preferably, this formation is carried out in a suitable device which provides intimate contacting of the oxygen-containing gas and the admixture, the oxygen-containing gas being supplied in sufficient quantity and velocity to accomplish both regeneration and "frothing" out or flotation of the sulfur. Because the volume of sulfur, admixture, etc. will vary depending on the circumstances, precise quantities and velocities of the oxygen-containing gas cannot be given. In general, however, the volume of oxygen-containing gas supplied will be at least that amount necessary to regenerate the polyvalent metal compound or chelate, or mixtures thereof, and preferably will be supplied in a stoichiometric excess of 50 to 100 percent. Formation of the sulfur-solution froth, per se, is accomplished in the regeneration zone according to well known principles, and in well known devices, as illustrated; for example, in Chemical Engineers Handbook, Third Edition, (1950) by Perry, pages 1085 through 1901, and Encyclopedia of Chemical Technology, 1966, by Kirk-Othmer, Vol. 9, pages 380 to 398, and references cited in each. For example, the contactor may comprise a vertical column with the oxygen-containing gas and sulfur-containing admixture entering in the lower part of the column, froth being removed near the top of the column, and spent air being removed overhead. As used herein, the term oxygen-containing gas includes oxygen, air, and air enriched with oxygen. Other gases may be present in significant quantity, such as $CO_2$, and may be added to assit in the flotation, so long as they do not interfere with the regeneration or separation. Again, it is not intended that substantial quantities of solvents other than water be employed.

Compounds having the formula $C_nH_{2n+1}OH$, in which n is a whole number from 4 through 15 (preferably 10 through 14) and compounds having the formula $C_nH_{2n-1}OH$, wherein n is a whole number from 4 through 20 (preferably 14 through 18), and mixtures thereof, may be used in extracting or removing the sulfur from the froth. As those skilled in the art will recognize, several of the compounds or compositions are solids at ordinary temperatures, and heat, as necessary, will be provided to convert the solid to liquid for the extraction (and maintain the compound or composition as a liquid, if necessary). In general, compounds or compositions according to the invention which have a melting point of 60° C. or below (preferably 45° C., or below) are preferred. Compounds which may be used include t-butanol, n-pentanol, n-octanol, n-decanol, n-undecanol, n-dodecanol, oleyl alcohol, 3-buten-1-ol, 1-hepten-4-ol-4 methyl, and mixtures thereof. Because the amount of the compound, or mixture of compounds required is dependent on the amount of sulfur produced, which is, in turn, dependent on the concentration of $H_2S$ in the gas stream treated, precise amounts of the compounds cannot be given. Those skilled in the art may adjust the amount, as required. In general, the amount will range from about 50 percent to about 300 percent (by volume, based on the volume of the polyvalent metal solution or polyvalent metal chelate solution in the froth), with an amount of 100 percent to about 200 percent by volume being preferred. The solid sulfur apparently is suspended preferentially in the liquid compound, or mixture of compounds, and may be recovered easily. The manner of recovering the sulfur after suspension is a matter of choice. For example, after separating the suspension (or a portion thereof) the sulfur may be recovered by settling, filtration, or by suitable devices such as a hydroclone. Preferably, however, the sulfur is melted, allowing separation by the simple expedient of allowing the sulfur to settle. As indicated, the oxygen-containing gas (in whatever form supplied) is supplied for regeneration in a stoichiometric equivalent or excess with respect to the amount of reactant present in the mixture.

The particular type of gaseous stream treated is not critical, as will be evident to those skilled in the art. Streams particularly suited to removal of $H_2S$ and $CO_2$ by the practice of the invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, and may range from about 0.1 percent to over 99 percent by volume. Obviously, the amounts of $H_2S$ and $CO_2$ present are not generally a limiting factor in the practice of the invention.

The temperatures employed in the contacting zone are not generally critical, except that the contacting is carried out at a temperature below the melting point of sulfur. In many commercial applications, such as the removal of $H_2S$ and $CO_2$ from natural gas to meet pipeline specifications, contacting at ambient temperatures is desired, since the cost of refrigeration would exceed the benefits obtained due to increased absorption at the lower temperature. In general, temperatures of from 10° C. to 80° C. are suitable, and temperatures from 20° C. to 45° C. are preferred. Contact times may range from about 1 second to about 270 seconds, with contact times of 2 seconds to 120 seconds being preferred.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture is required before return of the absorbent mixture to the absorption zone. In general, temperatures of from about 10° C. to 80° C., preferably 20° C. to 45° C. may be employed.

Pressure conditions in the absorption zone may vary widely, depending on the pressure of the gas to be treated. For example, pressures in the absorption zone may vary from one atmosphere up to one hundred fifty or even two hundred atmospheres. Pressures of from one atmosphere to about one hundred atmospheres are preferred. In the regeneration or desorption zone or zones, pressures may be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, which disclosures are incorporated herein by reference. Preferably, if the iron chelate of nitrilotriacetic acid is used, the pH in the process of the invention will range from about 6 to about 7.5, and the molar ratio of the nitrilotriacetic acid to the iron is from about 1.2 to 1.4. The process of the invention is preferably conducted continuously.

As indicated, the $H_2S$, when contacted, is quickly converted by the polyvalent metal ions, polyvalent metal chelate, etc. to elemental sulfur. The amount of polyvalent metal compound, polyvalent metal chelate, or mixtures thereof, supplied is an effective amount, i.e., an amount sufficient to convert all or substantially all of the $H_2S$ in the gas stream, and will generally be on the order of at least about one mol per mol of $H_2S$. Ratios of from about 1 mol to about 15 mols of polyvalent metal compound or chelate per mol of $H_2S$ may be used, with ratios of from about 2 mols per mol to about 5 mols of polyvalent metal compound or chelate per mol of $H_2S$ being preferred. A polyvalent metal chelate solution will generally be supplied as an aqueous solution having a concentration of from about 0.1 molar to about 2 molar, and a concentration of about 0.6 to 0.8 molar is preferred.

Any polyvalent metal may be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin. The metals are normally supplied as a salt, oxide, hydroxide, etc.

Preferred reactant materials are coordination complexes in which polyvalent metals form chelates with an acid having the formula

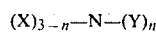

wherein n is a whole number from 1 to 3; Y is an acetic acid or propionic acid group; X is 2-hydroxy ethyl, 2-hydroxy propyl, or an alkyl group having from one to four carbon atoms; or

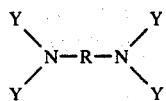

wherein:
from two to four of the groups Y are selected from acetic and propionic acid groups;
from zero to two of the groups Y are selected from 2-hydroxy ethyl and 2-hydroxy propyl, and
R is ethylene, propylene or isopropylene or alternatively cyclohexane or benzene where the two hydrogen atoms replaced by nitrogen are in the 1,2 position; and mixtures thereof.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include amino acetic acids derived from ammonia or 2-hydroxy alkyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950. The iron chelates of NTA and 2-hydroxyethyl ethylene diamine triacetic acid are preferred.

BRIEF DESCRIPTION OF THE DRAWINGS

In order to illustrate the invention with greater particularity, reference is made to the accompanying schematic drawing.

FIG. 1 illustrates the first embodiment of the invention, while

All values are merely exemplary or calculated, and similar number designations represent similar features.

In FIG. 1, a gas stream, such as a natural gas stream containing 1 percent $H_2S$ and 1.5 percent $CO_2$ by volume, enters via line 1 into contactor 2. Contactor 2 is a tray contactor, although any suitable contacting device (such as a venturi) may be employed. An oxidizing reactant mixture, e.g., an aqueous mixture containing 0.4 molar Fe(III) as the complex of nitrilotriacetic acid, enters contactor 2 via line 3. For illustrative purposes, it will be assumed that the gaseous stream enters at 200 MSCF per hour, while the reactant mixture enters at 5 M gallons per hour. Pressure of the gas in line 1 is 1000 PSIG, and the temperature of the gas is 30° C. Reactant mixture is supplied at a temperature of 30° C. and contact time is 45 seconds. The flow of liquid and gas, as illustrated, provides for good contact and reaction of the $H_2S$ in the stream to sulfur. As will be understood by those skilled in the art, water and the Fe(II) complex or chelate of nitrilotriacetic acid are also produced by the reaction. Sweet gas is removed overhead via line 4.

Figure 1:
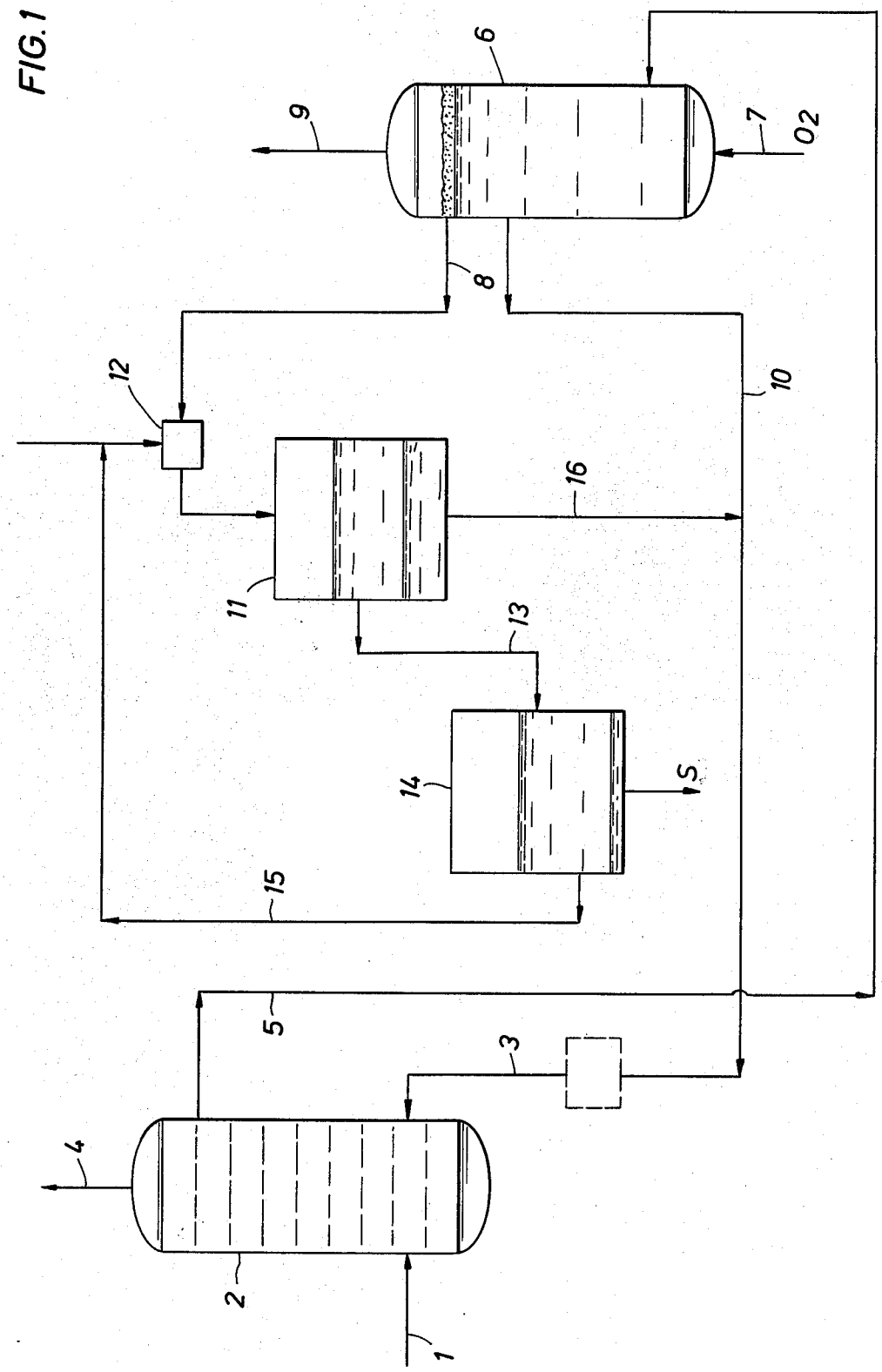

Reactant admixture is removed from contactor 2 via line 5. From line 5, the admixture enters regenerator 6 which comprises a vertical contactor column. Air from line 7 at a flow rate of 8 thousand standard cu. ft. per hour enters column 6 through spargers near the bottom of the column. A froth slurry is produced which is removed via line 8. Spent air is removed overhead via line 9, and regenerated admixture, i.e., admixture in which the bulk of the Fe(II) chelate has been oxidized to the Fe(III) chelate, is returned to contactor 2 via lines 10 and 3. Auxiliary means, such as a filter, are shown in dotted lines in line 10 to remove any residual sulfur not floated in regenerator 6, if necessary.

The froth, which is a slurry-like mixture of sulfur and regenerated admixture, is introduced via line 8 into separator 11. Preferably, prior to entry into unit 11, a stream of liquid n-decanol in line 15 joins line 8 at 12 in such a fashion that good mixing of the froth and the decanol occurs. In-line mixing may be used, or a suitable mixing device may be provided, if desired. For example, a Keenex mixer, or mixing devices provided with impellers may be used. The decanol may, of course, be added in unit 11, either wholly or in part, and the ratio of aqueous admixture to the decanol is approximately 1:1. The combination of the decanol and intimate mixing breaks the froth.

In unit 11, the mixture is allowed to separate into an upper decanol layer or phase, and a lower aqueous admixture layer. Surprisingly, even though sulfur normally has a density greater than 1.0, the sulfur may be said to "float" in the liquid decanol, and is easily separated from the aqueous admixture. Large depths of a sulfur-rich zone in alcohol can be built without sulfur sinking through the aqueous-alcohol phase interface. This considerably facilitates design of the process equipment. Decanol-sulfur mixture is removed from separator 11 via line 13 to a recovery zone or tank 14, where the sulfur is removed, preferably by warming the mixture to the melting point of sulfur. Optionally, only a portion of the upper phase may be removed, a "clarified" portion being separable so that only a portion of the upper phase need be heated. In any event, upon melting, the sulfur sinks to the bottom of tank 14, where it is easily removed. Decanol is removed via line 15 for reuse, after cooling.

Concomitantly, the regenerated admixture removed from the froth is removed from the lower layer in tank 11 via line 16 and returned to contactor 2, as shown.

Figure 2:
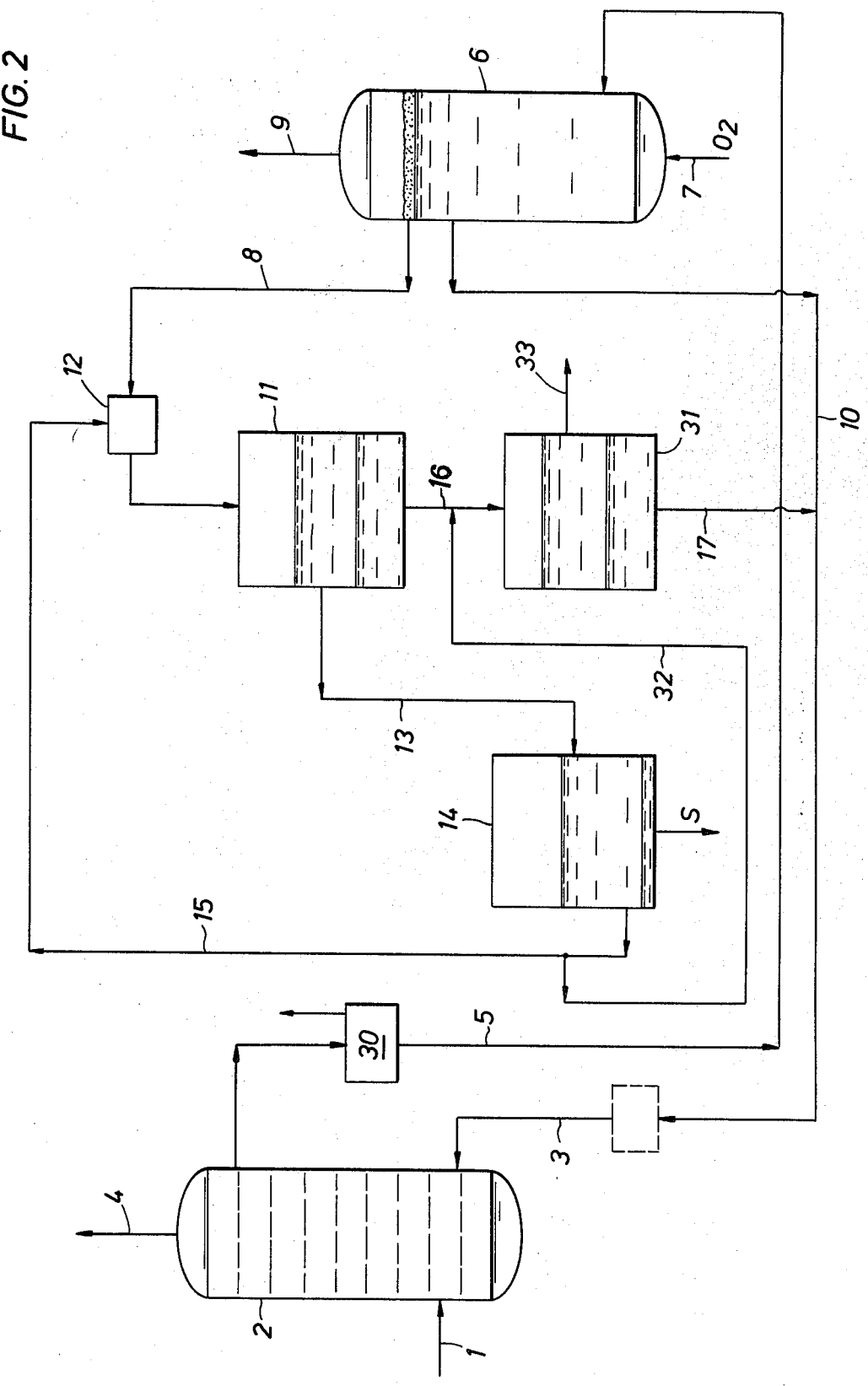
FIG. 2 illustrates the second embodiment.

In the embodiment shown in FIG. 2, sour gas, e.g., natural gas containing about 0.5 percent $H_2S$ and 32 percent by volume $CO_2$, in line 1 enters absorption column 2 (tray type) into which also enters, via line 3, an aqueous 0.8 M solution of the Fe(III) chelate of nitrilotriacetic acid. The pressure of the feed gas is about 1200 PSIG, and the temperature of the absorbent mixture is about 45° C. A contact time of about 45 seconds is employed. Purified or "sweet" gas leaves absorption column 2 through line 4. The "sweet" gas is of a purity sufficient to meet standard requirements. In the absorbent mixture, the $H_2S$ is converted to elemental sulfur by the Fe(III) chelate, the Fe(III) chelate in the process being converted to the Fe(II) chelate. The mixture, containing the elemental sulfur and the Fe(II)

chelate, is removed continuously and sent through line 5 after degassing in unit 30, to regeneration zone 6.

In regeneration zone 6 the loaded mixture is contacted with excess air in line 7, as described previously. The temperature of the regeneration column is about 45° C., and pressure in the column is maintained at about 2 atmospheres. The operation of units 6 through 12 is as described previously. However, separator 31 receives the liquid in line 16, and is contacted with cooled decanol from line 32. The bulk of any sulfur remaining in the admixture is removed from the admixture and may be recovered, via line 33, suitably in separator 14 (or, being lightly loaded, may be used in unit 12). The now fully regenerated admixture is returned via line 17 to absorption zone 2.

While the invention has been illustrated with particular apparatus, those skilled in the art will appreciate that except where specified, other equivalent or analogous units may be employed. The term "zones," as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives such as sodium oxalate, sodium formate, sodium thiosulfate, and sodium acetate, which may be beneficial.

What is claimed is:

1. A process for the removal of $H_2S$ from a sour gaseous stream comprising:
   (a) contacting the sour gaseous stream in a contacting zone with an aqueous reaction solution at a temperature below the melting point of sulfur, the mixture comprising an effective amount of a reactant selected from the group consisting of polyvalent metallic ions and polyvalent metal chelate compounds, and mixtures thereof, to produce a sweet gas stream and an aqueous mixture containing crystalline sulfur and a reduced reactant;
   (b) removing aqueous admixture from the contacting zone and contacting said aqueous admixture in a regeneration zone with an oxygen-containing gas under conditions to produce a regenerated aqueous admixture containing regenerated reactant and a froth containing sulfur and aqueous admixture;
   (c) removing froth from the regeneration zone and contacting said froth with a liquid extracting composition selected from compounds having the formula $C_nH_{2n+1}OH$, wherein n is a whole number from 4 through 15, and compounds having the formula $C_nH_{2n-1}OH$, wherein n is a whole number from 4 through 20, and mixtures thereof, in an amount sufficient to remove at least the bulk of the sulfur from the froth and produce a separate liquid layer containing sulfur and said composition, and forming a three-phase mass comprising an upper liquid layer comprising solid sulfur and said composition, and a lower layer in contact with said upper layer, said lower layer comprising regenerated aqueous admixture;
   (d) separating at least a portion of the upper liquid layer, and recovering sulfur from the portion separated;
   (e) returning regenerated aqueous admixture from the regeneration zone to the contacting zone.

2. The process of claim 1 wherein at least a portion of the upper liquid layer separated in step (d) is, after sulfur removal, returned to the extraction zone.

3. The process of claim 1 wherein at least a portion of the lower layer in step (d) is separated and returned to the contacting zone.

4. The process of claim 3 wherein the portion separated is, prior to return to the contact zone, contacted with additional extracting composition, and at least a portion of the additional extracting composition containing sulfur is separated.

5. The process of claim 2 wherein the reactant is the Fe(III) chelate of N-(2-hydroxyethyl)ethylenediamine triacetic acid.

6. The process of claim 2 wherein the reactant is the Fe(III) chelate of nitrilotriacetic acid.

7. The process of claim 3 wherein the reactant is the Fe(III) chelate of N-(2-hydroxyethyl)ethylenediamine triacetic acid.

8. The process of claim 3 wherein the reactant is the Fe(III) chelate of nitrilotriacetic acid.

9. The process of claim 4 wherein the reactant is the Fe(III) chelate of N-(2-hydroxyethyl)ethylenediamine triacetic acid.

10. The process of claim 4 wherein the reactant is the Fe(III) chelate of nitrilotriacetic acid.

11. The process of claim 2 wherein the extracting composition is a compound having the formula $C_nH_{2n-1}OH$, wherein n is a whole number from 4 through 18, and mixtures of such compounds.

12. The process of claim 3 wherein the extracting composition is a compound having the formula $C_nH_{2n-1}OH$, wherein n is a whole number from 4 through 18, and mixtures thereof.

13. The process of claim 11 wherein the reactant is the Fe(III) chelate of N-(2-hydroxyethyl)ethylenediamine triacetic acid.

14. The process of claim 12 wherein the reactant is the Fe(III) chelate of nitrilotriacetic acid.

15. The process of any of the preceding claims wherein the sulfur is recovered from the portion separated by melting.

* * * * *